June 11, 1940.  R. W. SMITH  2,204,260
APPARATUS FOR CALIBRATING MEASURING INSTRUMENTS
Filed March 24, 1937
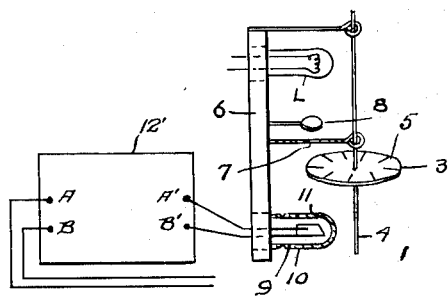
Fig. 1.
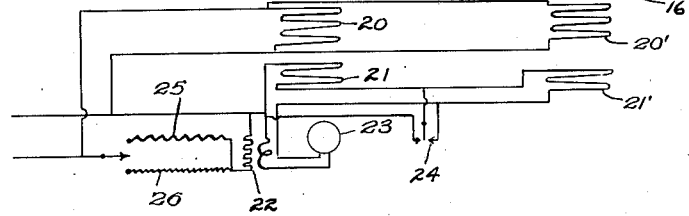
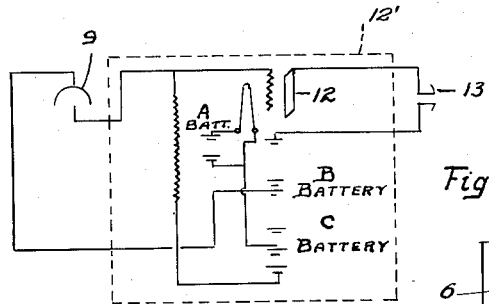
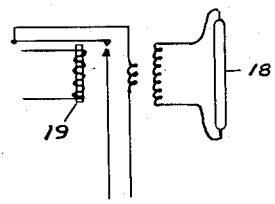
Fig. 3.
Fig. 2.
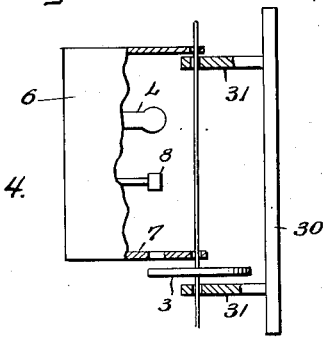
Fig. 4.
R. W. Smith
INVENTOR.
ATTORNEY.

Patented June 11, 1940

2,204,260

UNITED STATES PATENT OFFICE 2,204,260

APPARATUS FOR CALIBRATING MEASURING INSTRUMENTS

Rulo Wayne Smith, Auburn, Ind.

Application March 24, 1937, Serial No. 132,809

3 Claims. (Cl. 175—183)

The invention relates to apparatus for calibrating measuring instruments and it is particularly directed to the calibration of electric watt-hour meters.

Various devices have been produced for calibrating purposes, some of them involving the application of the stroboscopic principle, but, so far as I am aware, none of them is practical for use in the field, as well as in the factory or laboratory. A portable outfit which is capable of calibrating watt-hour meters accurately and inexpensively in the field, as well as in the factory or laboratory, is very desirable since it will save much time and labor, especially where the meters are installed in the service lines of customers. In my invention I make use of the stroboscopic principle and for its operation dependence is placed upon mental retention rather than upon retinal persistence. I use a standardized watt-hour meter which has or is assumed to have accuracy of rotating standard excellence and mount a slotted or perforated or toothed opaque disk on the rotating shaft of the meter through which the beam from an incandescent lamp is projected at intervals, which, through other instrumentalities, causes a light to flash on a disk mounted on the shaft of the meter to be tested. The latter disk carries a reference mark the position of which, as the disk rotates, is observed at a flash of the light relatively to some contiguous fixed object whereby the speed of rotation of the latter disk in relation to that of the standard disk, is noted.

The invention is illustrated in the accompanying drawing in which

Figure 1 is a schematic view of a standard electric meter and an electric meter to be tested having the invention applied thereto.

Fig. 2 is the wiring diagram of the photo electric cell, the amplifying tube and glow lamp.

Fig. 3 is a wiring diagram of a modification using a relay and glow tube, or other illuminating device instead of a glow lamp, and Figure 4 is a side elevation of a portion of the device showing the housing partly broken away and the mounting therefor.

Referring to the illustrative drawing, I represents a standardized watt-hour meter having accuracy of rotation and 2 represents a watt-hour meter to be tested. A disk 3 is attached to the revoluble shaft 4 of the meter I and a selected number of openings or radial slots 5 is formed in the disk depending upon the disk constant.

In the present illustration I provide nine slots in the disk 3 so that the standard meter with such disk thereon will suffice for calibrating many of the meters generally in use. These slots, as shown in Fig. 1, are very narrow compared to the spaces between them. It is to be understood, as will be presently apparent, that the reason for the narrowness of these slots is to so affect a small incandescent light that it will be momentarily energized as each slot passes a given point. Obviously, if the slots are made wide there will be a continued illumination from the small lamp rather than a flash and consequently the stroboscopic effect will be entirely lost, and it is because of this stroboscopic effect that the present invention enables the testing of a wattmeter to be effected.

For convenience and compactness I pivotally mount a housing 6 on the meter I so that it will overhang the disk 3 and swing on the axis of the stem 4. A narrow slot 7 is formed in the bottom of the housing. Between the lamp and the bottom of the housing is mounted a lens 8 that will condense the light rays from the lamp and direct a beam through the slot 7. The bottom of the housing is perpendicular to the axis of the shaft 4 and the axis of the slot 7 intersects the axis of the shaft 4.

A photo-electric cell 9 is mounted on an extension of the housing and extends under the disk 3. An opaque jacket 10 surrounds the cell and a window 11 is formed in the upper side of the jacket and under the disk 3 so that a beam of light from the lamp that passes through the slot 7 and any slot in the disk 3 will also pass through the window and project onto the cell. The cell is therefore subjected to illumination at the instant each slot in the rotating disk registers with the slot 7. The pivotal mounting of the housing is illustrated in Figure 4, in which 30 represents a base or back plate and 31 the upper and lower bearing blocks for the shaft 4 of the meter having the radially slotted armature disk 3 thereon.

The cell 9 is electrically connected to an amplifier 12' including amplifier tube 12 and the latter is electrically connected to a glow lamp 13 supported adjacent to the watt-hour meter 2 to be tested for illuminating the disk 15 that is mounted on its shaft. A reference mark 16 is formed on the disk 15. In the illustrative meter 2 the disk 15 travels close to the free ends of the fixed members 17 and the reference mark travels across the space between them and either or both members may be considered a fixed object so that the position of the mark between said members is readily noted, the flash of light from the lamp 13 illuminating the mark as it appears between the members. For example, starting with the mark being visible at the flash of the lamp 13 intermediate the members 17, the position of the mark is observed at the flash of the lamp when it is next adjacent to the members. The lamp 13, of course, flashes at each registration of a slot in the disk 3 with the slot 7. If the mark is seen to have passed beyond the intermediate position, the meter being tested is running too rapidly, and, if the mark lags behind the intermediate position, the meter is running too slowly. Obviously the lighting of the mark must be only momentary so that the mark will not appreciably move for each lighting of the lamp 13.

The two meters are connected to a common source of electrical energy. In Fig. 2 I illustrate the wiring diagram of the photocell 9, the amplifying tube 12 and the glow lamp 13 in which, for simplicity, I show the source of power as furnished by batteries. In practice, I use the common source of energy to secure the desired current for the photocell and amplifying tubes by means well known and in common use.

The frame 6 having the slot 7 in its bottom wall and carrying the lamp L, the lens 8 and the photocell 9, is pivoted relatively to the shaft 4 of the standard meter so that the unit may be swung about the axis of the shaft 4 to adjust the position of the slot 7 relatively to the slots in the disk 3 in order that the glow lamp will flash when the reference mark on the disk of the meter being tested is in the selected position relatively to the fixed object.

As illustrated in Fig. 3, I may substitute a relay switch 19 for the glow lamp 13 and by it control the circuit for actuating the neon glow tube 18 which is installed in the laboratory and the like and whose light will illuminate the disk of the meter to be tested.

Any desired load may be placed on the two meters. A phantom load effect is accomplished by connecting the potential coils 20, 20' (Fig. 1) of the standard and test meters respectively in parallel to the source of energy and connecting the current coils 21, 21' of the said meters respectively in series with the secondary winding of a transformer 22, the primary coil of which is connected to the source of energy through either of two resistors 25, 26. An ammeter 23 also is connected in the secondary circuit. A switch 24 may be connected as shown in the circuit of the current coils of the meters, by the operation of which switch the current coils of either of the two meters may be shunted, thereby causing the meter whose current coils are so shunted to remain at rest.

By operating the switch to shunt the current coil of the meter to be tested which causes it to stop rotating, I may turn the disk thereon to adjust its reference mark with respect to the fixed object and then at a flash of the glow lamp operate the switch to break the shunt. The test meter now operates again and the position of the mark is noted at the end of the first revolution and again after the next revolution thereof and any overrunning or underrunning is corrected by adjusting the meter.

What I claim is:

1. In a portable meter calibrating mechanism the combination with a watt-hour meter having a rotating disk having alternate light transmitting and light retarding areas, the transmitting areas consisting of radial slits very narrow compared to the light retarding areas, of a light generating means, means to direct a beam of light therefrom towards the disk, a photo-electric cell exposed to the light that passes through the light transmitting areas on the disk, the light generating means and the beam directing means and the cell being mounted for unitary adjustment about the axis of the disk, a second watt-hour meter having a single reference mark on its rotating armature disk, means to place any desired load on the meters, a fixed element of the latter meter and above the disk thereof with respect to which the position of the mark may be observed as the latter disk rotates and means responsive to the intermittent operation of the cell to flash illuminate the disk of the second meter.

2. In a portable meter calibrating mechanism the combination with a watt-hour meter having a rotating disk having alternate light transmitting and light retarding areas, the transmitting areas consisting of radial slits very narrow compared to the light retarding areas, of a light generating means, means to direct a beam of light therefrom towards the disk and including a slotted member disposed above and parallel to the disk, the slit therein being adapted to register longitudinally with any slit in said disk, a photoelectric cell exposed to the light that passes through the light transmitting areas on the disk, the light generating means and the beam directing means and the cell being mounted for unitary adjustment about the axis of the disk, a second watt-hour meter having a single reference mark on its rotating armature disk, means to place any desired load on the meters, a fixed element of the latter meter and above the disk thereof with respect to which the position of the mark may be observed as the latter disk rotates and means responsive to the intermittent operation of the cell to flash illuminate the disk of the second meter.

3. In a portable meter calibrating mechanism the combination with a watt-hour meter having a rotating disk having alternate light transmitting and light retarding areas, the transmitting areas consisting of radial slits very narrow compared to the light retarding areas, of a light generating means, means to direct a beam of light therefrom towards the disk, a photoelectric cell exposed to the light that passes through the light transmitting areas on the disk, the light generating means and the beam directing means and the cell being mounted for unitary adjustment about the axis of the disk, a second watt-hour meter having a single reference mark on its rotating armature disk, a fixed element of the latter meter and above the disk thereof with respect to which the position of the mark may be observed as the latter disk rotates, means responsive to the intermittent operation of the cell to flash illuminate the disk of the second meter, each meter having a potential coil and a current coil, the potential coils being connected in a parallel circuit and the current coils being connected in a series circuit, a source of power for the potential coil circuit and for the current coil circuit, and means for disconnecting either of said current coils selectively from the source of power while maintaining the other current coil in circuit.

RULO WAYNE SMITH.